Dec. 23, 1969  G. W. BROWN ET AL  3,485,939

ELECTRIC CABLE WITH ADHERED POLYMARIC INSULATION

Filed April 24, 1968

GROVER W. BROWN
KENYON W. KINGSLEY
INVENTORS

BY *H.C.Goldwire*

AGENT

United States Patent Office 3,485,939
Patented Dec. 23, 1969

3,485,939
ELECTRIC CABLE WITH ADHERED POLYMERIC INSULATION
Grover W. Brown, Glen Rock, and Kenyon W. Kingsley, Butler, N.J., assignors to The Okonite Company, Passaic, N.J., a corporation of Delaware
Filed Apr. 24, 1968, Ser. No. 723,841
Int. Cl. H01b 7/18
U.S. Cl. 174—107         6 Claims

ABSTRACT OF THE DISCLOSURE

Disclosed are two adhesive compositions which, when used in combination, adherently bond a polymeric insulation material comprising a terpolymer of ethylene, propylene, and a diene to an electrical conductor or to a metal cable shield.

---

This invention relates to electrical cable, and more particularly, to polymerically insulated cable capable of withstanding severe service environments and methods of making the same.

Electrical cable which can withstand severe operating conditions is sought for many applications. One such application is use in an oil well where the cable must be resistant to the various substances found there, such as aliphatic and aromatic hydrocarbons, brine, carbon dioxide, and hydrogen sulfide. Moreover, the cable must withstand the effects of the corrosive agents for long periods of time at elevated temperatures, as high for example, as 250 to 350° F.

Many polymeric materials have been suggested for insulating electrical cable from extremely severe service conditions. One such material is a terpolymer of ethylene, propylene, and a diene. Heretofore, however, it has not been possible to adherently bond this polymeric material to an electrical conductor or to a metal shield.

Accordingly, one object of the present invention is to provide an improved polymerically insulated cable capable of withstanding severe operating conditions.

Another object of the invention is to provide an electrical cable having insulation comprising a terpolymer of ethylene, propylene and a diene adherently bonded to an electrical conductor.

Yet another object of the invention is to provide an electrical cable having insulation comprising a terpolymer of ethylene, propylene, and a diene adherently bonded to a metal shield.

A further object of the invention is to provide a method of adherently bonding a terpolymer of ethylene, propylene, and a diene to an electrical conductor or to a metal shield.

Other objects, features, and advantages of the invention will be apparent from the following detailed description when taken together with the appended claims and accompanying drawing illustrative of the invention wherein:

Figure 3:
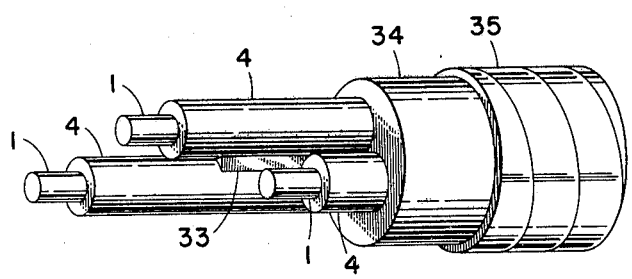
Figure 4:
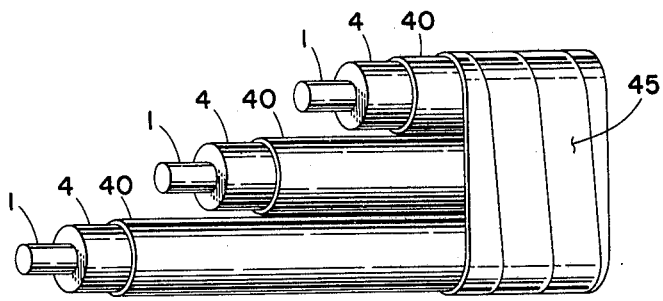

FIGURE 3 is a fragmentary perspective view of a round multiconductor cable employing three of the electrical cables constructed in accordance with the invention, with some of the successive strata around the conductor partly removed in order to show their relationship to each other, and FIGURE 4 is a fragmentary perspective view of a flat, parallel multi-conductor cable employing three of the electrical cables constructed in accordance with the invention, with some of the successive strata around the conductor partly removed in order to show their relationship to each other.

Throughout the various figures, like elements are designated by the same reference numerals.

The diene of the terpolymer employed in the present invention is a non-conjugated diene capable of polymerizing with ethylene and propylene, and which, upon polymerization, as appendant on the ethylene-propylene main chain. Typically, the diene comprises less than ten weight percent of the terpolymer, the remainder consisting of ethylene and propylene in the weight percentage ratio of ethylene to propylene of approximately 3:2. Examples of suitable dienes are 1,4 hexadiene, dicyclopentadiene, and ethylidene norbornene. When used hereinafter, the term "ethylene-propylene-diene terpolymer" refers to a terpolymer of ethylene, propylene and a diene such as specified above.

There are a number of commercially available adhesives which might be considered for adhering an ethylene-propylene-diene terpolymer to a metal. The present inventors have found that generally the adhesives are either adherent to the metal of the electrical conductor (metal adhesives) or adherent to the polymer (polymer adhesives). As further found by the inventors, combinations of adhesives do not necessarily produce an adherent bond. For example, the metal adhesive sold by the Hughson Company of Erie, Pennsylvania under the trademark Chemlock 215 applied to the metal as a first coating followed by a coating of a polymer adhesive marketed by the Dayton Chemical Laboratories, Inc., Dayton, Ohio under the trademark Thixon XAP 757 failed to adherently bond an ethylene-propylene-diene terpolymer composition to the metal. For purposes of this invention, an adherent bond is one which is stronger than the insolution material being bonded to the conductor. Thus, if the insulation is adherently bonded to the conductor, an effort to remove the insulation by stripping results entirely in the rupture of the insulation and not the adhesive bond.

The adhesive Chemlok 215 is described in U.S. Patent 3,099,632 and comprises in its broadest aspect a chlorinated rubber, an expoxylated novolak, and an epoxy resin curing agent. The formulation of Chemlock 215 is belived to be substantially described at column 11, lines 20–32, of the patent. Hence, the adhesive contains about 85 parts by weight of chlorinated natural rubber having a viscosity as a 20% solution in toluene at room temperature of 125 centipoise (pcs.), 15 parts by weight of an epoxylated novolak having a viscosity of 60,000 cps. and an epoxide equivalent weight of 175–182, 1.5 parts by weight of meta-phenylene diamine and 30 parts by weight of finely divided carbon, e.g. neutral carbon black. The solids are dissolved and dispersed in a 2:1 mixture by volume of ethyl ketone and xylene to provide a formulation having a solids content of 22–24%.

The adhesive designated Thixon XAP 757 has a solids content consisting essentially of 17% by weight of a chlorinated triphenyl plasticizer, 35% of an ethylene-propylene-diene terpolymer, and 2% of elemental sulfur as a curing agent, the remainder being a filler of finely divided carbon. The solids are dissolved in a solvent mixture of heptane and toluene.

Contrary to what might reasonably be concluded from the above, Chemlok 215 in combination with another polymer adhesive sold by Dayton Chemical Laboratories, Inc., Thixon XAP 386, produces an extremely strong and durable band between a metal and an ethylene-propylene-diene terpolymer. The only significant differences between Thixon XAP 757 and XAP 386 are that the curing agent in XAP 386 is dicumyl peroxide rather than sulfur, that the proportion of terpolymer is somewhat higher in XAP 386, and that the ratio of ethylene to propylene in the terpolymer of XAP 386 is slightly higher than in XAP 757. Moreover, it has been found by the inventors that it is not merely the substitution of dicumyl perovide for sulfur that produces the desired result. Further investigation of adhesives having formulations similar to Thixon XAP 386 indicates that there are critical composition limits on the weight percentage of plasticizer and terpolymer.

Figure 1:
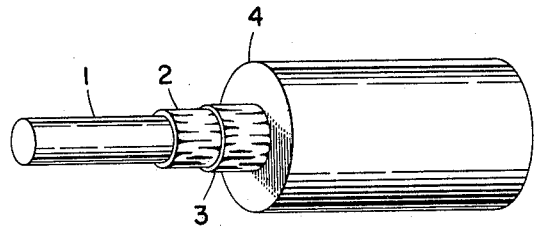
FIGURE 1 is a fragmentary perspective view of a section of an electrical cable constructed in accordance with the invention, with the successive strata around the conductor partly removed in order to show their relationship to each other.

Referring now to the drawings, FIG. 1 depicts a polymerically insulated electric cable comprising an electrical conductor 1, a first adhesive material 2 covering the conductor and adherently bonded thereto, a second adhesive material 3 covering the first adhesive material and adherently bonded thereto, and polymeric insulation material 4 covering the second adhesive material and adherently bonded thereto. The electrical conductor 1 is a single solid wire or a plurality of wires and consists of any suitable metal. It may consist of one of the common uncoated conductors such as aluminum or copper, or the conductor, for example copper, may be coated with lead, tin, silver, bronze, alloys of lead and tin, or alloys of lead, tin, bismuth and antimony. The first adhesive material 2 consists essentially of a chlorinated rubber, an epoxylated novolak, an epoxy curing agent, and finely divided carbon, and by way of example, may be Chemlok 215 described above. The second adhesive material consists essentially of an ethylene-propylene-diene terpolymer, a chlorinated triphenyl plasticizer, a peroxide curing agent, and finely divided carbon, and by way of example, may be Thixon XAP 386 identified above. In order to produce an adherent, non-strippable bond, the second alhesive must consist essentially of 50–55% by weight ethylene-propylene-diene terpolymer, 14–19% by weight chlorinated triphenyl plasticizer, and may further comprise about 1.0% by weight dicumyl peroxide, the remainder being finely divided carbon, such as lamp black. The polymeric insulation material 4 comprises an ethylene-propylene-diene terpolymer. While virtually any material which comprises the terpolymer in substantial proportion may be used, in a preferred form the polymeric insulation further comprises a surface treated clay, an antioxidant, a stabilizer, a vulcanizing agent, and a curing agent. In a specific preferred embodiment, the ethylene-propylene-diene terpolymer is Nordel 1145 sold by the E. I. DuPont Co., the surface treated clay is calcined aluminum silicate, the antioxidant is polymerized trimethyl dihydroquinoline, the stabilizer is cadmium stearate, the vulcanizing agent is red lead oxide ($Pb_3O_4$), and the curing agent is dicumyl peroxide. As will be apparent to one skilled in the art, various other fillers and plasticizers may be added to the above composition to achieve the processing and physical characteristics desired.

Figure 2:
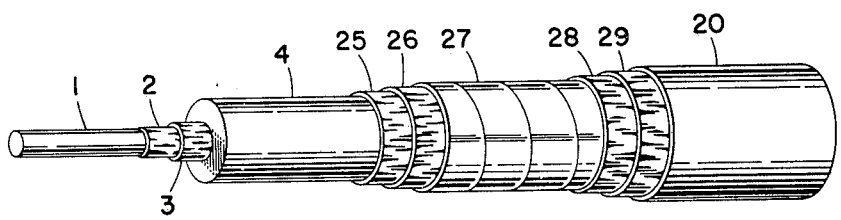
FIGURE 2 is a fragmentary perspective view of an electrical cable constructed in accordance with another embodiment of the invention, with the successive strata around the conductor partly removed in order to show their relationship to each other.

As will be seen from FIG. 2, the adhesive system described above is also useful for bonding metal components to the outer surface of the polymeric insulation 4, as well as further bonding elastomeric materials to the metal components. FIG. 2 depicts a polymerically insulated electric cable having the elements of the cable shown in FIG. 1 designated by the same reference numerals, and further comprising a layer 25 of the second adhesive material covering the polymeric insulation material and adherently bonded thereto, a layer 26 of the first adhesive material covering the layer 25 and adherently bonded thereto, a metal layer 27 covering the layer 26 and adherently bonded thereto, a layer 28 of the first adhesive covering the metal layer 27 and adherently bonded thereto, a layer 29 of the second adhesive covering the layer 28 and adherently bonded thereto, and a protective layer 20 of an elastomeric material covering the layer 29 and adherently bonded thereto. The metal layer 27 may be any suitable metal such as copper, commercial bronze or steel, consists of helically wrapped metal tape of either the flat or contoured interlocking type, wire braids, or wire servings, and serves as an electrostatic shield and as armor to protect the insulation from physical damage. The Thixon XAP 386 adhesive, or an equivalent thereto, provides the added advantage of serving as a "shield screen" under the metal layer 27. A layer of the adhesive has the low DC resistivity required for dissipating electrical charges away from the interface of the insulation 4 and the metal layer 27. If a void develops between the metal and the insulation, the conductive adhesive dissipates the charges induced between the metal and the insulation thus avoiding corona discharge, which might damage the insulation 4. The layer 20, which serves as an over-all covering for the cable, may comprise any elastomer which, after vulcanization, strongly bonds to the second adhesive. For example, the elastomer may be neoprene; a copolymer of butadiene and acrylonitrile; mixtures of polyacrylonitrile and polyvinylchloride; a terpolymer of ethylene, propylene, and a diene; mixtures of a terpolymer of ethylene, propylene and a diene plus a copolymer of butadiene and acrylonitrile; a copolymer of ethylene oxide and epichlorohydrin; or a mixture of a copolymer of ethylene oxide and epichlorohydrin and a copolymer of butadiene and acrylonitrile.

The method of producing the polymerically insulated electrical cable in accordance with the present invention is illustrated as follows. The first adhesive (described with respect to FIGS. 1 and 2) is prepared by mixing 70 to 90 parts by weight chlorinated rubber, 10 to 30 parts by weight epoxylated novolak, 1 to 3 parts by weight epoxy curing agent, and 22 to 35 parts by weight finely divided carbon such as carbon black in an amount of a solvent, consisting of methyl ethyl ketone and xylene in the volume ratio of 2:1, sufficient to produce a composition having 20 to 24% by weight solids. The second adhesive (described with respect to FIGS. 1 and 2) is prepared by mixing 50 to 55% by weight of an ethylene-propylene-diene terpolymer having a Mooney viscosity of 40 after four minutes at 250° F., 14 to 19% by weight of a chlorinated triphenyl plasticizer, about 1% by weight of a peroxide curing agent and about 30% by weight finely divided carbon in an amount of a solvent, consisting of heptane and toluene in the volume ratio of 1.5:1, sufficient to produce a composition having 13–15% by weight solids. The adhesive materials are applied in a continuous manner to the conductor and dried. Thereafter, the coated conductor passes to conventional cross-head extrusion apparatus. The ethylene-propylene-diene polymeric insulation composition is introduced into the screw of the extruder on which the composition is heated and masticated. As the polymeric composition becomes plastic it is forced into a chamber or head fixed to the delivery end of the extruder at right angles to the screw. The head contains a guiding device for the conductor and a suitable forming die with a tapered, annular opening for forming the polymeric composition around and in intimate contact with the coated conductor. Preferably, a lubricating oil is applied over the adhesive coated conductor to facilitate passage of the conductor through the guiding device in the cross-head. The cross-head is in turn fixed to a high pressure steam tube containing steam maintained at 250 p.s.i. gauge pressure. The high temperature and pressure cause curing of the cable as it moves through the tube. Besides cross-linking the polymeric insulation, the combination of heat and pressure fluxes, fuses, and cross-links the various materials together. That is to say, the first adhesive is bonded to the conductor and to the second adhesive, the second adhesive is bonded to the first adhesive and to the polymeric insulation.

To form the cable shown in FIG. 2, after layers 2–4 have been applied to the conductor 1 as described above, the layer 25 of the second adhesive is put on and dried.

Thereafter the layer 26 of the first adhesive is applied and dried, followed by the application of the metal layer 27 in a conventional manner. The layers 28 and 29 are then put on and dried. The elastomeric covering 20 is applied thereover by the same extrusion and curing techniques as used for insulation layer 4, described above.

The following specific example will further serve to illustrate the principles of the present invention.

EXAMPLE

In making a polymerically insulated cable as illustrated in FIG. 1, the first adhesive material was prepared by mixing 80 parts by weight chlorinated rubber, 20 parts by weight of an epoxylated novolak, two parts of an epoxy curing agent, metaphenylene diamine, and about 30 parts by weight of neutral carbon black. The components were added to a 2:1 mixture of methyl ethyl ketone and xylene, resulting in an adhesive composition having 22% solids. The second adhesive material was prepared by combining 52% by weight of a polymer of ethylene, propylene, and ethylidene nonbornene having a Mooney viscosity of 40 after four minutes at 250° F., 16% by weight of a chlorinated triphenyl plasticizer, 1% by weight dicumyl peroxide curing agent and 31% by weight lamp black carbon filler. The components were combined on a two roll mill and dissolved in a 1.5 to 1 mixture of heptane and toluene to produce an adheseve composition having 14% solids. The electrical conductor in the form of a copper wire coated with an alloy of 98% lead and 2% tin was degreased with chloroethene. A thin coating of the first adhesive material was then applied to the conductor and dried. A thin coating of the second adhesive material was applied to the coating of the first adhesive material and dried. A covering of a polymeric insulating material comprising an ethylene-propylene-diene terpolymer, specifically Nordel 1146; a surface treated clay, calcined aluminum silicate; an antioxidant, polymerized trimethyldihydroquinoline; a stabilizer, cadmium stearate; a vulcanizing agent, red lead oxide ($Pb_3O_4$); and a curing agent, dicumyl peroxide; was extruded over the surface of the coated conductor in a thickness of 64 mils and cured for two minutes at 400° F.

In the above example, methylene bis(orthochloroaniline) can be substituted for the metaphenylene diamine in preparing the first adhesive. It will be understood, of course, that it is not necessary to make the adhesive compositions if the commercial products Chemlok 215 and Thixon XAP 386 are available.

A round, multi-conductor cable useful for carrying current in severe service environments is shown in FIG. 3. The cable is formed by assembling together by any conventional method three of the cables depicted in FIG. 1 around an elastomeric filler 33 consisting essentially of one of the elastomers used in layer 20 described above with respect to FIG. 2. For simplicity of illustration, the adhesive layers are not shown in FIG. 3. Three of the cables shown in FIG. 2 may also be employed in the multi-conductor cable. After the three cables are assembled, a suitable elastomeric covering 34, which may be any of the elastomers used for filler 33, is applied over, vulcanized and bonded to the three cables. Thereafter, a metal layer 35 is applied over layer 34. The metal layer 35 may be any suitable metal such as commercial bronze or steel, consists of helically wrapped metal tape of either the flat or contoured interlocking type, and serves as armor to protect the plurality of cables from physical damage. The number of cables used in such multi-conductor cables can be varied to meet electrical circuit needs, and, for example may be two, four, or more.

A flat, parallel multi-conductor cable useful for carrying current in extreme service environments is shown in FIG. 4. To form the cable, a suitable elastomeric layer 40, consisting essentially of one of the elastomers used in layer 20 discussed above with respect to FIG. 2, is applied over the cable depicted in FIG. 1, vulcanized and bonded thereto by a suitable adhesive such as Thixon XAP 386. For simplicity of illustration, the adhesive layers are not shown in FIG. 4. Thus, the conductor 1 is surrounded by a layer of polymeric insulation 4 comprising an ethylene-propylene-diene terpolymer, which in turn is covered by an elastomeric jacket 40. As well as this insulated, elastomerically jacketed cable, the cable shown in FIG. 2 may also be used. The three insulated and protected conductors are assembled with the longitudinal axis of each conductor parallel to the other, and are snugly disposed within metal layer 45. The metal layer may be any suitable metal such as commercial bronze or steel, consists of helically wrapped metal tape of either the flat or contoured interlocking type, and serves as armor to protect the plurality of cables from damage. The number of cables used in such multi-conductor cables can be varied to meet electrical circuit needs, and, for example, may be two, four, or more.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:

1. A polymerically insulated electric cable comprising an electrical conductor,
   a first adhesive material covering the conductor and consisting essentially of a chlorinated rubber, an epoxylated novolak, an epoxy curing agent, and finely divided carbon,
   a second adhesive material covering the first adhesive and consisting essentially of 50–55% by weight of an ethylene-propylene-diene terpolymer, 14–19% by weight of a chlorinated triphenyl plasticizer, the remainder being a peroxide curing agent and finely divided carbon, and
   a polymeric insulation material covering the second adhesive material and comprising an ethylene-propylene-diene terpolymer.

2. The cable in accordance with claim 1 wherein the polymeric insulation material further comprises a surface treated clay, an antioxidant, a stabilizer, a vulcanizing agent, and a curing agent.

3. The cable in accordance with claim 2 wherein the surface treated clay is calcined aluminum silicate, and the curing agent is dicumyl peroxide.

4. The cable in accordance with claim 1 wherein the second adhesive material contains about 1.0% by weight dicumyl peroxide.

5. The cable in accordance with claim 1 further comprising
   a layer of the second adhesive material covering the polymeric insulation material,
   a layer of the first adhesive material covering the layer of the second adhesive material,
   a metal layer covering the layer of the first adhesive material,
   a layer of the first adhesive material covering the metal layer,
   a layer of the second adhesive material covering the layer of the first adhesive material and,
   a protective layer of an elastomeric material covering the layer of second adhesive material.

6. The method of adhering a polymeric insulation to an electrical conductor comprising the steps of:
   mixing 70 to 90 parts by weight chlorinated rubber, 10 to 30 parts by weight epoxylated novolak, 1 to 3 parts by weight epoxy curing agent, and 22 to 35 parts by weight finely divided carbon in an amount of a solvent, consisting of methyl ethyl ketone and xylene in the volume ratio of 2:1, sufficient to produce a first adhesive composition having 20 to 24% by weight solids, applying the first adhesive composition to the conductor, mixing 50 to 55% by weight of an ethylene-propylenediene terpolymer having a Mooney viscosity of 40 after four minutes at 250° F., 14 to 19% by weight of a chlorinated triphenyl plasticizer, 1.0% by weight of a peroxide curing agent and about 30% by weight finely divided carbon in an amount of a solvent, consisting of heptane and toluene in the volume ratio of 1.5:1, sufficient to produce a second adhesive composition having 13–15% by weight solids, applying the second adhesive composition to the conductor, covering the second adhesive composition with a polymeric insulation material comprising a calcined clay, an anti-oxidant, a stabilizer, and a peroxide curing agent in an ethylene-propylenediene terpolymer.

References Cited

UNITED STATES PATENTS

| | | | |
|---|---|---|---|
| 3,436,288 | 4/1969 | Patterson | 117—72 X |
| 3,364,155 | 1/1968 | Souffie | 260—889 X |
| 3,354,107 | 11/1967 | Hamed | 260—889 X |
| 3,096,210 | 7/1963 | Boonstra | 117—216 |
| 3,048,651 | 8/1962 | Howard et al. | 117—120 |

LEWIS H. MYERS, Primary Examiner

A. T. GRIMLEY, Assistant Examiner

U.S. Cl. X.R.

156—51; 174—110, 120; 260—3.5 33.8